Feb. 26, 1935.   A. T. POTTER   1,992,885
CONTROL MEANS FOR WINDSHIELDS
Filed April 23, 1931   3 Sheets-Sheet 1
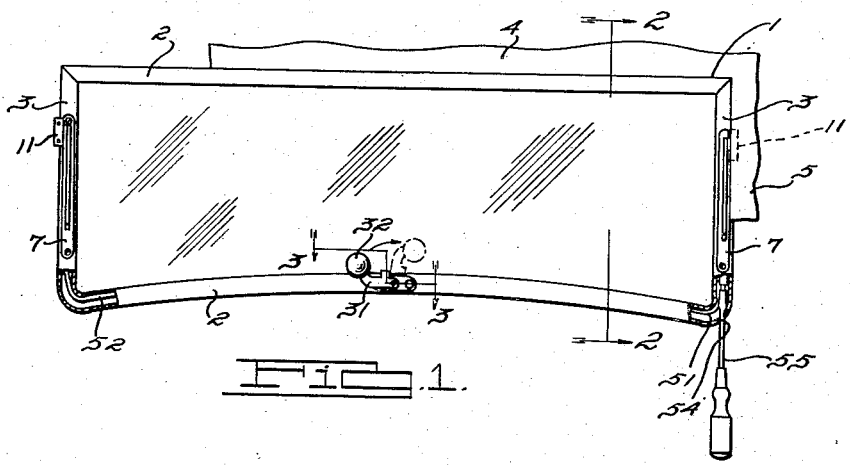
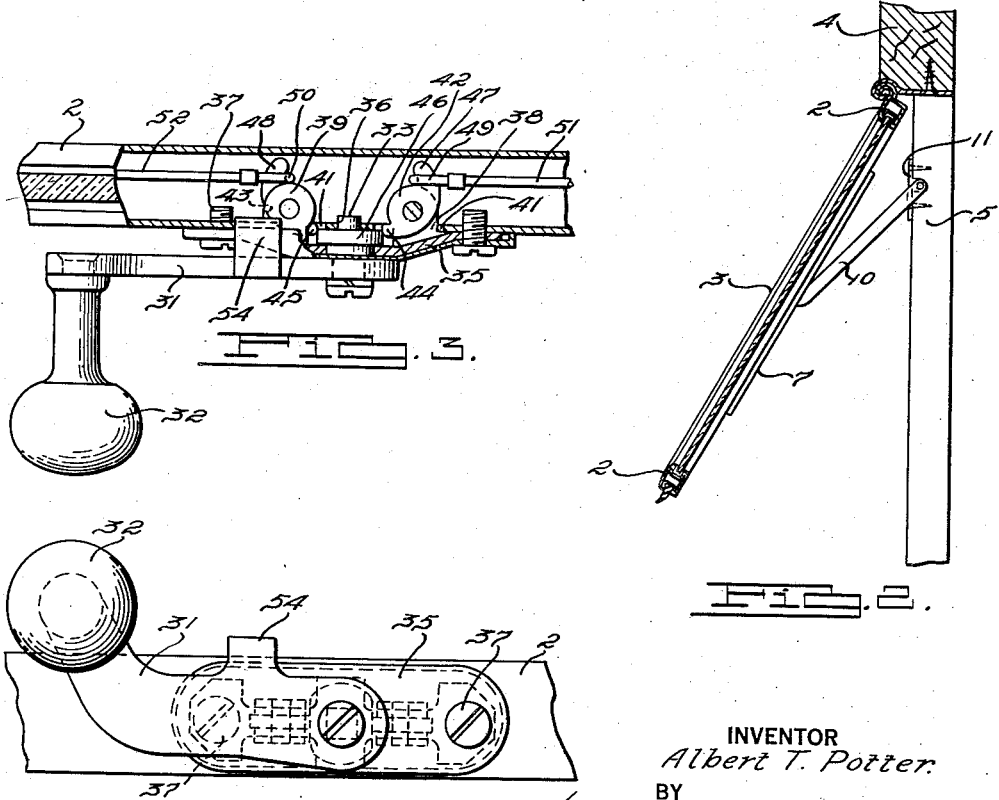
INVENTOR
Albert T. Potter.
BY
Harness, Dickey, Pierce & Hann
ATTORNEYS.

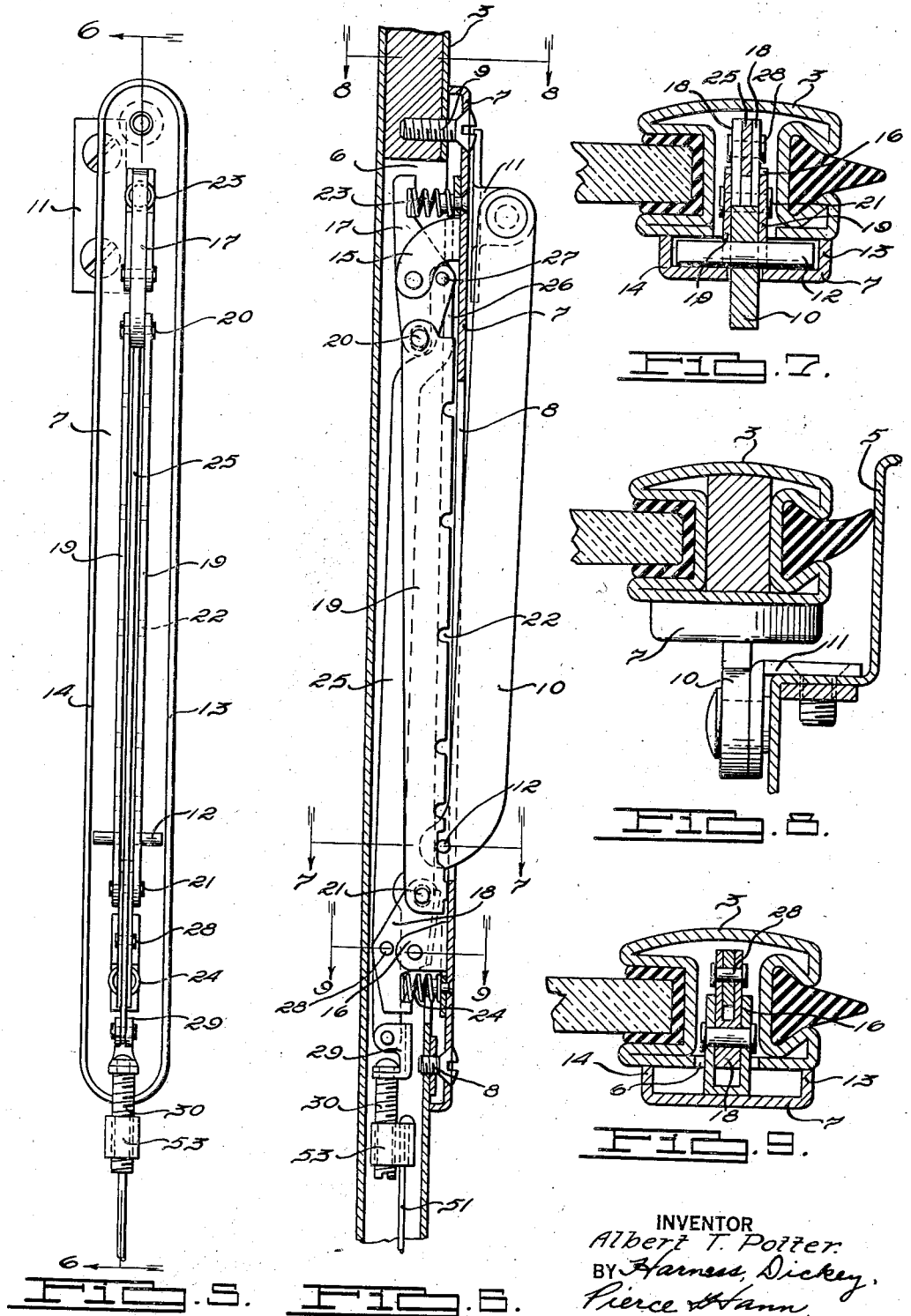

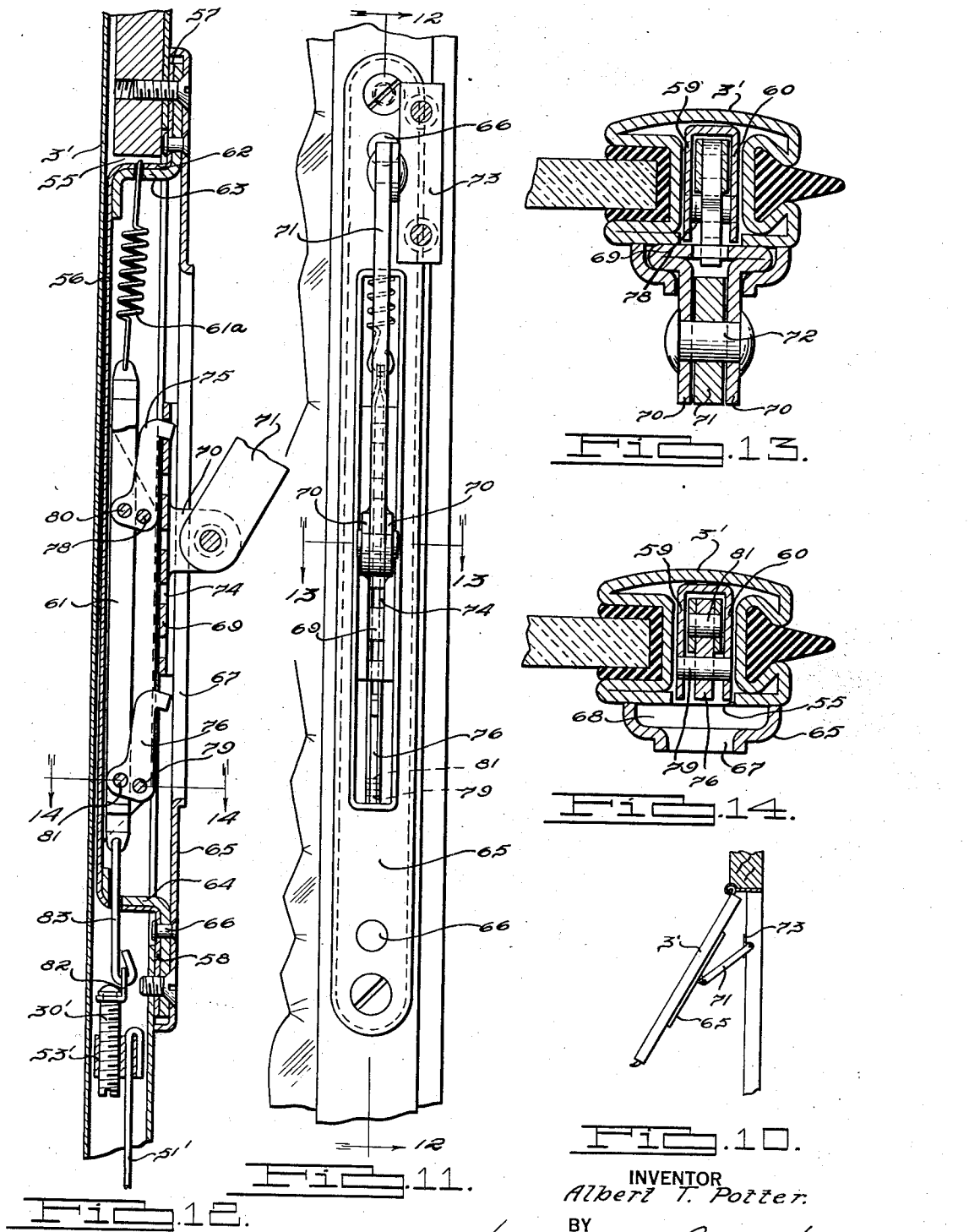

Patented Feb. 26, 1935

1,992,885

UNITED STATES PATENT OFFICE 1,992,885

CONTROL MEANS FOR WINDSHIELDS

Albert T. Potter, Detroit, Mich., assignor to Ainsworth Manufacturing Company, a corporation of Michigan Application April 23, 1931, Serial No. 532,245

8 Claims. (Cl. 296—84)

This invention relates to improved means for selectively holding a windshield in different predetermined open positions and particularly to means for controlling such apparatus.

The main objects of the invention are to provide improved variable braces on the respectively opposite sides of a windshield frame and corner posts or windshield casing of a vehicle for holding the windshield in a selected open position; to provide braces of this kind which are pivoted at one end on the windshield casing and slidably mounted at their other ends on the side members of the windshield frame; to provide apparatus which is completely confined within the frame structure of the windshield for releasably holding the slidable ends of the braces against movement relative to the windshield frame in any one of a plurality of different positions, and to provide apparatus of this kind, which until released, positively holds the windshield against both opening and closing movements.

Further objects of the invention are to provide a single, conveniently located control mechanism for operating the holding apparatus of both sides of the windshield frame; to provide an operating handle in control mechanism of this kind which may be grasped by an operator and rotated for releasing the shiftable ends of the braces, and which may then be pressed upon so as to permit an operator to open the windshield with one hand; to provide flexible connecting members between the brace holding apparatus and the control mechanism; and to provide adjustable means for tensioning the flexible members which is accessible through a small and inconspicuous opening in the windshield frame, and which permits the members to be conveniently attached to the control mechanism while they are in a relaxed condition during assembly of the windshield control means.

An illustrative embodiment of the invention is shown in the accompanying drawings, in which—

Fig. 1 is an internal side elevation of a vehicle windshield which is equipped with my improved windshield adjusting means.

Fig. 2 is a transverse vertical sectional view taken on the line 2—2 of Fig. 1, and showing the windshield in an open position.

Fig. 3 is an enlarged fragmentary sectional view taken on the line 3—3 of Fig. 1, and showing the manual mechanism in detail.

Fig. 4 is a fragmentary, enlarged elevation showing the manual mechanism as viewed from the interior side of the windshield.

Fig. 5 is a rear elevation of a brace holding unit which is convenable in an end member of a windshield frame.

Fig. 6 is a longitudinal vertical sectional view taken on the line 6—6 of Fig. 5.

Fig. 7 is a transverse horizontal sectional view taken on the line 7—7 of Fig. 6.

Fig. 8 is a transverse horizontal sectional view taken on the line 8—8 of Fig. 6.

Fig. 9 is a transverse vertical sectional view taken on the line 9—9 of Fig. 6.

Fig. 10 is a vertical sectional view similar to Fig. 2 but showing a modified form of the invention.

Fig. 11 is a front elevation of a windshield brace and brace holding apparatus illustrating the form of the invention shown in Fig. 10.

Fig. 12 is a longitudinal vertical sectional view taken on the line 12—12 of Fig. 11.

Fig. 13 is a transverse vertical sectional view taken on the line 13—13 of Fig. 11.

Fig. 14 is a transverse horizontal sectional view taken on the line 14—14 of Fig. 12.

In the form shown in Figs. 1 to 9, inclusive, the invention is illustrated in conjunction with an adjustable windshield which includes a frame 1 having tubular side and end members 2 and 3, respectively. The upper side member 2 of the frame is pivotally attached to a vehicle body header bar 4 which constitutes the upper side of a windshield casing having end members 5. In some instances the corner posts of a vehicle serve as end members of the windshield casing.

Each end member 3 of the windshield frame is provided with a longitudinal opening 6 in which are mounted windshield control units of substantially identical construction, of the type shown in Figs. 5 and 6. Each control unit includes a channel-shaped support or face plate 7 having a longitudinal slot 8 which communicates with the opening 6 of the tubular end member 3. The face plate is rigidly mounted on the latter by screws 9. A brace 10 having an end slidably mounted on the support and extending into the slot 8 thereof is provided at its outer extremity with a pivotally attached bracket 11, for pivotally securing the outer end of the brace to the end member 5 of the windshield casing. The inner or lower end portion of the brace 10 is provided with an aperture through which a pin 12 extends. This pin is located adjacent the internal side of the support 7 between the side flanges 13 and 14 thereof.

Rigidly mounted on the internal side of the support 7 are spaced inwardly extending bifurcated lugs 15 and 16 which are located outwardly from the respectively opposite extremities of the slot 8 and between the sides of which are pivotally mounted bell crank levers 17 and 18. The adjacent ends of the bell crank lever 17 and 18 are connected together by a pair of laterally spaced links 19 which are identical in shape, the end portions of the links 19 bear against the respectively opposite sides of the bell crank lever 17 and 18 and they are pivotally attached to the adjacent end of the latter by pins 20 and 21, respectively, which extend through slightly elongated apertures in the bell crank levers.

Formed in the outer edges of the links 19 are registering spaced notches 22 in which the pin 12 of the brace 10 is receivable. Coil springs 24 and 23 which bear between the outer ends of the bell crank lever 17 and 18, respectively, and the inner side of the channel-shaped face plate 7 normally urge the links 19 outwardly so as to positively hold the pin 12 against unintended displacement from a selected pair of notches.

Each unit of the respectively opposite end members 3 of the windshield frame is provided with control mechanism by which the links 19, which hold the slidable end of the brace 10 in any one of a plurality of predetermined positions, may be moved to an inoperative position so as to permit the windshield to be swung inwardly or outwardly from one position to another selected position. This control mechanism includes a shiftable bar 25 having an offset end portion 26 which is pivotally attached at 27 to an intermediate portion of the bell crank lever 17, as shown in Fig. 6. The slidable bar 25 is pivotally attached at its lower end portion to the intermediate part of the bell crank lever 18 by a pin 28 and it extends downwardly beyond the bell crank lever 18. Pivotally attached to the lower end of the bar 25 is a bracket 29 on which is journaled an adjustable screw 30.

The pivotal attachments 27 and 28 of the bar 25 and the bell crank lever 17 and 18, respectively, are located on opposite sides of the pivotal axes of the bell crank levers. For this reason when the bar 25 is shifted relative to the tubular end member 3 in which it is confined, the bell crank levers are simultaneously rotated in respectively opposite directions. Rotation of the bell crank levers in respectively opposite directions moves the links 19 inwardly with respect to the tubular end member to an inoperative position.

With the above arrangement of the bell cranks 17 and 18, bar 25 and links 19; the springs 23 and 24 have the same action, so that either spring may be slightly heavier and the other spring omitted without affecting the action upon the links 19.

The control units of the respectively opposite side member 3 of the windshield frame are connected together so as to be operable simultaneously by apparatus having a single manual operating handle which may be mounted in any conveniently accessible position on the windshield frame, but preferably at the center of the lower side member 2 of the frame. This operating mechanism includes a crank having an external crank arm 31 and handle 32 which are rigidly fixed to an inwardly extending shaft 33 that is journaled in an aperture in a bracket 35 and in a registering aperture 36 formed in the wall of the lower side member 2. The bracket 35 is rigidly mounted on the lower side member 2 of the windshield frame by screws 37 and it is provided with inwardly extending lugs 38 and 39 which are received in aperture 41 in the lower side member 2.

Pivotally mounted on the lugs 38 and 39 are bell crank levers 42 and 43 respectively which have inwardly extending projections 44 and 45. A cam 46 is fixed on the shaft 33 and located between the inwardly extending projection 44 and 45 which bear upon the periphery of the cam. The bell crank levers 42 and 43 have outwardly extending ears 47 and 48 which extend through loops 49 and 50 on the adjacent ends of a pair of wire cables 51 and 52 respectively. These wire cables extend in opposite directions through the lower tubular side member 2 of the windshield frame to the windshield control units of the respectively opposite end members of the frame, to which they are connected in the manner illustrated in Figs. 5 and 6. The outer ends of the cables are fixed to a shiftable member 53 which is threaded on the screws 30, the lower end of the screw 30 registering with an aperture 54 through which a screw driver 55 may be extended, as illustrated in Fig. 1, so as to tension the cables. With the aid of these adjustable elements, the cables may be hooked on the ears 47 and 48 during assembly of the apparatus in a windshield frame while they are in a relaxed condition and they may be conveniently tensioned to a desired degree after assembly.

In operation, the crank is normally allowed to remain in the full line position shown in Fig. 1, so as to allow the links 19 to be held in an operative position by the spring 23 and 24 for preventing the slidable end of the brace 10 from moving relative to the windshield frame. When it is desired to vary the position of the windshield, the operating crank is rotated substantially through a 180° to the dotted line position shown in Fig. 1. During this operation the bell crank lever 42 and 43 are rotated about their axes in respectively opposite directions by the cam 46 so as to pull inwardly upon the adjacent ends of the cable 51 and 52. The cables 51 and 52 simultaneously move the shiftable bar 25 downwardly and rotate the bell crank levers 17 and 18 in the above manner so as to move the links 19 substantially perpendicularly away from the face plate 7. This action disengages the pin 12 from the notch in which it was previously seated and permits the shiftable end of the brace 10 to be moved to another selected position.

When the operating handle is in the dotted line position, shown in Fig. 1, holding the locking bar provided by the links 19, in a retracted position, the operating handle may be pressed or pulled upon so as to open or close the windshield. After the windshield has been moved to a selected position, the operating handle is then returned to its full line position shown in Fig. 1, at which further rotation of the handle is arrested by a lug 54 on the crank arm 31 that abuts against the brackets 35. This return rotation of the operating handle releases the shiftable bar 25 and permits the links 19 to be moved to an operative position by the springs 23 and 24.

In the form shown in Figs. 10 to 14, inclusive, the tubular end member 3' of a windshield frame is provided on its inner side with an opening 55 in which a metal strip 56 is received. The intermediate portions of the metal strip 56 lie adjacent the outer wall of the tubular end member 3' and the end portions of the metal strip extend outwardly from the interior of the tubular member and have flanges 57 and 58 seated upon the external surface of the inner wall of the tubular member. Integrally formed on the metal strip 56 are registering flanges 59 and 60 which provide a U-shaped trough, shown in Fig. 13.

A slidable bar 61 comprising a pair of spaced parallel links is located between the flanges 59 and 60 and yieldably held against downward movement by a spring 61ª which is attached at one end to the bar 61 and at its other end to the outwardly extending portions 62 of the metal strip 56 and to a rigid member 63 by which the upper end portion of the strip 56 is reinforced. The reinforcing member 63 extends outwardly from the opening of the tubular end member following the contour of the end portion of the metal strip 56 and lying in superimposed relation upon the flange 57 thereof. The lower end portion of the metal strip 56 is also provided with a reinforcing member 64 which conforms in curvature with the lower end portion of the metal strip.

A facing plate 65 is rigidly attached at its respectively opposite end portions by rivets 66 to the flanges 57 and 58 of the sheet metal strip 56 and to the outer portions of the reinforcing member 63 and 64. This facing plate has a longitudinal slot 67, and it extends laterally beyond the side edges of the opening 55 in the end member 3' of the windshield frame forming spaced guide-ways 68 in which the edge portions of a shiftable shoe 69 are slidably mounted.

Integrally formed on the shoe 69 are outwardly extending flanges or lugs 70 between which the lower end of a brace 71 is received. A rivet 72 extends through registering apertures in the lugs 70 and brace 71 and pivotally secures the lower end of the brace to the shoe 69. Pivotally mounted on the upper end of the brace 70 is a bracket 73 which is securable to a side member of a windshield casing in the manner illustrated in Fig. 10. The shoe 69 is provided with a series of aligned apertures 74 for receiving protruding end portions of dogs 75 and 76 which are pivotally supported on pins 78 and 79 carried by the flanges 59 and 60 of the metal strip 56 respectively. The dogs 75 and 76 are received between the spaced links of the bar 61 to which they are pivotally attached by pins 80 and 81 respectively.

A windshield having control mechanism of the type illustrated in Figs. 10 to 14, inclusive, is also provided with operating mechanism of the type shown in Figs. 1 and 3. In this form of the invention the cable 51' which leads from the right tubular end member of the windshield frame is fixed to a shiftable member 53' which is threaded on a screw 30' that is in turn journaled in a bracket 82. The bracket 82 is connected by a link 83 with the lower end of the shiftable bar 61.

When the bar 61 is moved downwardly by pulling upon the cable 51' in the manner described above, the dogs 75 and 76 are rotated in a counter-clockwise direction so as to move their protruding ends away from the shoe 69. The protruding end of the dog 75 extends into one of the apertures 74 of the shoe and holds the lower end of the brace against movement relative to the windshield frame when the shoe 69 is in the upper end of its range of movement, and the bar 61 is released. The protruding end of the dog 76 operates in the same manner when the shoe 69 is at the lower portion of its range of movement. When the bar 61 is moved downwardly the protruding end of the effective dog is retracted from the aperture 74 in which it was previously received and the lower end of the brace 71 is free to move relative to the frame of the windshield as the latter is adjusted in position.

In applying this control mechanism to a windshield, it is to be noted that there are three unitary sub-assemblies, and that these sub-assemblies may be quickly and readily assembled into the windshield frame.

In both forms of the invention, the means which hold the lower ends of the braces of the respectively opposite sides of a windshield are simultaneously conditioned so as to release the braces and permit their movement during adjustment of the windshield. Substantially all parts of the control apparatus are concealed in the tubular structure of the windshield frame and they are so constructed as to permit the apparatus to be readily assembled on windshields of conventional construction.

Although but several specific embodiments of the invention have been herein shown and described, it will be understood that numerous details of the construction shown may be altered or omitted without departing from the spirit of this invention as defined by the following claims.

I claim:

1. Windshield control apparatus including a brace, an element for pivotally attaching said brace to a windshield casing, a support for slidably securing an end of said brace to a windshield frame, a pair of spaced bell crank levers pivotally mounted on said support, a link pivoted at its extremities to the adjacent ends of said bell crank levers and having spaced notches for holding the slidable end of said brace in various predetermined positions, yieldable means for holding said link in an operative position, and apparatus for simultaneously rocking both of said bell crank levers in respectively opposite directions so as to move said link to an inoperative position.

2. Windshield control apparatus including a brace, an element for pivotally attaching said brace to a windshield casing, a support for slidably securing an end of said brace to a windshield frame, a pair of spaced bell crank levers pivotally mounted on said support, a link pivoted at its extremities to the adjacent ends of said bell crank levers and having spaced notches for holding the slidable end of said brace in various predetermined positions, yieldable means for holding said link in an operative position, apparatus for simultaneously rocking both of said bell crank levers in respectively opposite directions so as to move said link to an inoperative position, and means for manually operating said apparatus adapted to be mounted on said frame in spaced relation to said support.

3. In a structure including a windshield casing, a windshield pivotally mounted on said casing including a tubular end member having an opening therein, a face plate mounted on said end member having a longitudinal slot communicating with said opening, a brace pivotally mounted on said casing having an end portion slidable in said slot, a pair of spaced bell crank levers pivotally mounted on the inner side of said face plate and located in said tubular end member, a link pivoted at its respectively opposite ends to the adjacent ends of said bell crank levers and having spaced notches for locking the slidable end of said brace in various positions, means for yieldably holding said link in an operative position, and manual control mechanism for shifting said link to an inoperative position.

4. In a structure including a windshield casing, a windshield adjustably mounted on said casing including a tubular frame having a longitudinal slot in one tubular end member thereof, a brace pivotally mounted on said casing and having an extremity slidably mounted in said slot, releasable locking means including a toothed member concealed in the tubular end member of said frame for selectively locking the slidable end of said brace in one of a plurality of predetermined positions, and mechanism mounted on the intermediate portion of a side of said frame for moving and guiding said toothed member away from the slidable extremity of said brace in a direction substantially normal with respect to said tubular end member of said frame to release said locking means, and including a member extending through the side and end of said frame for connecting said mechanism and said locking means for effecting the release of the latter.

5. In a structure including a windshield casing; a windshield pivotally mounted on said casing including a tubular frame; a pair of braces, one end of each brace being pivotally mounted on each end of said casing and the other end of each brace being slidably attached to the adjacent end of said tubular frame; releasable locking means including a pair of toothed members, one member being concealed in each end of said tubular frame, for releasably locking the slidable ends of said braces in various corresponding positions; and a single operating member for actuating said toothed members to release said locking means.

6. In a structure including a windshield casing; a windshield pivotally mounted on said casing including a tubular frame; a pair of braces, one end of each brace being pivotally mounted on each end of said casing and the other end of each brace being slidably attached to the adjacent end of said tubular frame; releasable locking means including a pair of toothed members, one member being concealed in each end of said tubular frame, for releasably locking the slidable ends of said braces in various corresponding positions; and a single operating member provided with an external operating handle for actuating said toothed members to release said locking means, said operating handle being pivotally mounted on the intermediate portion of the lower side of said tubular frame.

7. A windshield controlling apparatus including a brace, an element for pivotally attaching the brace to a windshield casing, a support for slidably securing an end of the brace to a windshield frame, a bar shiftably mounted on said support and having spaced notches for releasably holding the slidable end of the brace in various predetermined positions, resilient means normally holding the bar in operating position, and mechanism cooperating with both ends of the bar for shifting and guiding it from its inoperative position and in a direction substantially normal to the support, said mechanism including a flexible element adapted for manual manipulation.

8. A windshield controlling apparatus including a support adapted to be secured to a windshield frame, means slidably secured to the support and adapted to co-act with said windshield and the windshield casing so as to retain the windshield in selected open positions, a member shiftably mounted on said support for positively locking said means in selected positions, actuating means cooperating with both ends of said member for shifting and guiding the member substantially perpendicular to said support and into an inoperative position, a yieldable element for normally holding said member in an operative position and means for manually operating said actuating means and mounted on said frame in spaced reation to said support.

ALBERT T. POTTER.